United States Patent
Rosman et al.

(10) Patent No.: US 9,399,507 B2
(45) Date of Patent: Jul. 26, 2016

(54) JOINTS BETWEEN A COMPOSITE SKIN AND A LOAD-BEARING COMPONENT AND METHODS OF FORMING SAME

(71) Applicant: The Boeing Company, Seal Beach, CA (US)

(72) Inventors: Richard R. Rosman, Seattle, WA (US); Bernhard Dopker, Bellevue, WA (US); Wallace Chi-Hua Chan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 82 days.

(21) Appl. No.: 14/161,241

(22) Filed: Jan. 22, 2014

(65) Prior Publication Data

US 2015/0203185 A1 Jul. 23, 2015

(51) Int. Cl.
*B64C 1/12* (2006.01)
*B64C 1/00* (2006.01)
*B29C 65/56* (2006.01)
*B29C 65/00* (2006.01)
*B29L 31/30* (2006.01)

(52) U.S. Cl.
CPC .............. *B64C 1/12* (2013.01); *B29C 65/562* (2013.01); *B29C 66/1122* (2013.01); *B29C 66/21* (2013.01); *B29C 66/532* (2013.01); *B29C 66/721* (2013.01); *B29C 66/7392* (2013.01); *B29C 66/7394* (2013.01); *B29L 2031/3082* (2013.01); *B64C 2001/0072* (2013.01); *Y02T 50/433* (2013.01); *Y10T 29/49696* (2015.01); *Y10T 403/70* (2015.01); *Y10T 403/7075* (2015.01)

(58) Field of Classification Search
CPC .............. B64C 1/06; B64C 1/12; B64C 1/10; B64C 3/18; F16B 5/02; E04B 1/61; E04B 2/60; E04C 3/28; E04C 3/29
See application file for complete search history.

(56) References Cited

U.S. PATENT DOCUMENTS

| | | | | |
|---|---|---|---|---|
| 3,248,840 A | * | 5/1966 | Petterson | E04B 2/60 52/775 |
| 3,477,752 A | * | 11/1969 | Richter | E04B 2/60 52/464 |
| 4,507,011 A | * | 3/1985 | Brown | B29C 65/562 156/304.3 |
| 5,562,264 A | | 10/1996 | Bietenhader | |
| 5,716,178 A | * | 2/1998 | Vu | F16B 37/044 411/104 |
| 7,195,418 B2 | | 3/2007 | Durand et al. | |
| 7,857,258 B2 | * | 12/2010 | Normand | B64C 1/069 105/401 |

(Continued)

FOREIGN PATENT DOCUMENTS

| | | | | |
|---|---|---|---|---|
| FR | 2943944 | | 10/2010 | |
| WO | WO 2013138835 A1 | * | 9/2013 | ............... F16B 5/02 |

OTHER PUBLICATIONS

International Search Report, Application No. 14198370.0-1754, dated Jun. 1, 2015, pp. 7.

*Primary Examiner* — Joseph W Sanderson
(74) *Attorney, Agent, or Firm* — Armstrong Teasdale LLP

(57) ABSTRACT

A method of forming a direct bearing joint includes providing a load bearing structure including a first structural feature having an arcuate shape and providing a composite skin including a second structural feature also having an arcuate shape. The method also includes coupling the first structural feature to the second structural feature such that the first and second structural features are mated against each other to facilitate distributing compressive loads induced into the load bearing structure into the composite skin.

15 Claims, 10 Drawing Sheets

(56) References Cited

U.S. PATENT DOCUMENTS

| | | | |
|---|---|---|---|
| 7,875,333 B2 * | 1/2011 | Stephan | B32B 3/02 244/120 |
| 7,909,290 B2 | 3/2011 | Cooper | |
| 8,016,237 B2 * | 9/2011 | Berry | B64C 1/12 244/131 |
| 8,226,870 B2 | 7/2012 | Garcia Laja et al. | |
| 8,333,345 B2 | 12/2012 | Kajita et al. | |
| 8,490,920 B2 | 7/2013 | Karem | |
| 2003/0146346 A1 | 8/2003 | Chapman, Jr. | |
| 2005/0224655 A1 * | 10/2005 | Guittard | B64C 1/06 244/133 |
| 2007/0011970 A1 * | 1/2007 | Hethcock | B64C 1/068 52/481.1 |
| 2008/0217479 A1 | 9/2008 | Wood | |
| 2008/0258008 A1 * | 10/2008 | Cooper | B64C 1/12 244/131 |
| 2008/0283675 A1 * | 11/2008 | Zuniga Sagredo | B64C 3/18 244/35 R |
| 2009/0020646 A1 * | 1/2009 | Normand | B64C 1/069 244/120 |
| 2009/0169324 A1 | 7/2009 | Fritsch | |
| 2009/0294589 A1 * | 12/2009 | Berry | B64C 1/12 244/123.1 |
| 2010/0124659 A1 | 5/2010 | Nelson et al. | |
| 2011/0016823 A1 * | 1/2011 | Wood | B60J 1/006 52/745.16 |
| 2012/0132753 A1 * | 5/2012 | Caballero | B64C 1/12 244/131 |
| 2012/0201999 A1 | 8/2012 | Woods et al. | |
| 2012/0305169 A1 | 12/2012 | Hanks et al. | |
| 2013/0026297 A1 * | 1/2013 | McCullough | B29D 99/001 244/131 |
| 2013/0084422 A1 | 4/2013 | Thable et al. | |
| 2013/0196121 A1 * | 8/2013 | Beumler | B29C 70/088 428/189 |
| 2014/0224932 A1 * | 8/2014 | Cardin | B64C 1/069 244/119 |
| 2014/0224933 A1 * | 8/2014 | Paul | B64C 1/06 244/129.1 |
| 2014/0318693 A1 * | 10/2014 | Nelson | B29C 35/0266 156/196 |

* cited by examiner

JOINTS BETWEEN A COMPOSITE SKIN AND A LOAD-BEARING COMPONENT AND METHODS OF FORMING SAME

BACKGROUND

The implementations described herein relate generally to forming a joint between two or more mechanical components, and, more specifically, to forming a direct bearing joint between a load-bearing component and composite component.

At least some known aircraft are designed and manufactured using large amounts of composite materials. For example, composite materials are used in an aircraft to decrease the weight of the aircraft. Decreasing the overall weight may improve performance features, such as, for example, payload capacities and fuel efficiencies. At least some known aircraft include a fuselage structure including a thin load-bearing composite skin supported by circumferential bulkheads designed to transfer shear stresses and to retain the shape of the fuselage. Major load carrying metal components, such as wings spars, the keel beam, and wheel well longerons, for example, are coupled to both the bulkheads and the composite skin to distribute concentrated loads to the composite skin.

During at least some known metal or composite aircraft construction, bulkheads, major load bearing components, and composite skin are joined together via metal fasteners. As the amount of load to be distributed increases, the number and size of fasteners required to join the components together increases. However, because fasteners have a minimum spacing allotment from each other and from the skin edge, increasing the size and number of fasteners also increases the overall size and weight of the joint required to join the components. In some cases, the joint may become impractical because of space limitations if for example, the larger joint may interfere with other systems of the aircraft. Furthermore, in at least some known aircraft, a gap may be defined between the skin and the structure transferring load to the skin, such that the load path extends only through the fasteners that couple the skin to the structure. In such cases, if one or more of the fasteners fail, the load would be distributed to the remaining fasteners, thus increasing the risk of their failure as well.

At least one known construction solution is to distribute the concentrated load over multiple locations along the aircraft such that each location has less load to bear. However, such a construction method still results in a net increase of fasteners that are distributed across additional joints. Moreover, in similar cases the additional joints may also interfere with other aircraft systems, such as the landing gear. As such, increasing the quantity of fasteners or the size of the fasteners to join various aircraft components generally result in a significant increase in weight, complexity, and cost penalties for larger loads.

BRIEF DESCRIPTION

In one aspect, a method of forming a direct bearing joint is provided. The method includes providing a load bearing structure including a first structural feature having an arcuate shape and providing a composite skin including a second structural feature also having an arcuate shape. The method also includes coupling the first structural feature to the second structural feature such that the first and second structural features are mated against each other to facilitate distributing compressive loads induced into the load bearing structure into the composite skin.

In another aspect, a direct bearing joint is provided. The direct bearing includes a load bearing structure including a first structural feature having an arcuate shape and a composite skin that is coupled to the load bearing structure. The composite skin includes a second structural feature that also has an arcuate shape. The second structural feature mates against the first structural feature to facilitate distributing compressive loads induced into the load bearing structure into the composite skin.

In yet another aspect, an aircraft comprising a direct bearing joint is provided. The aircraft includes a load bearing structure including a first structural feature having an arcuate shape and a composite skin that is coupled to the load bearing structure. The composite skin includes a second structural feature that also has an arcuate shape. The second structural feature mates against the first structural feature to facilitate distributing compressive loads induced into the load bearing structure into the composite skin.

DETAILED DESCRIPTION

The implementations described herein relate to direct bearing joints and methods of forming the same. More specifically, in the exemplary enablement, the direct bearing joint is formed as a continuous interface between a composite skin and a metallic load bearing structure. In the exemplary implementation, the composite skin includes an arcuate cutout that mates against a correspondingly-shaped feature on the load bearing structure at a location where a compressive point load is applied to the structure. The methods described herein facilitate distributing large compressive point loads by directly transferring at least a portion of the load into the skin, such that a first load path is formed at the direct bearing joint between the skin and the structure and such that a second load path is defined through a plurality of fasteners that couple the skin and structure together. Multiple loads paths reduce the number and size of the fasteners required to transfer loads into the composite skin, and thus reduce the overall weight and cost of the structure including the direct bearing joint. The plurality of fasteners also serve to transfer tension and shear loads that cannot be transferred via direct bearing.

Figure 1:
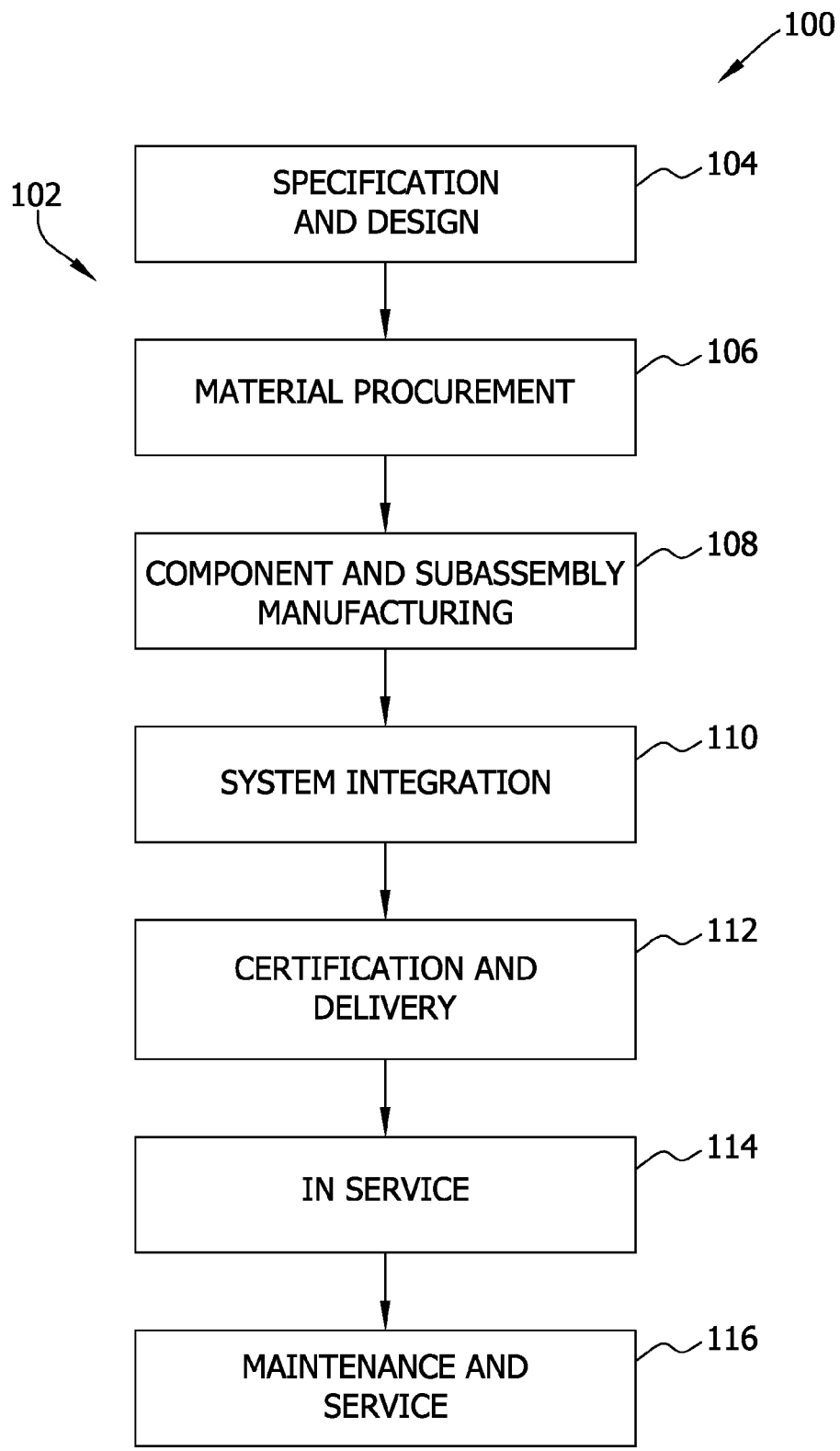
FIG. 1 is a flow diagram of an exemplary aircraft production and service methodology.

Referring now to FIG. 1, implementations of the disclosure may be described in the context of an aircraft manufacturing and service method 100 and via an aircraft 102. During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 2:
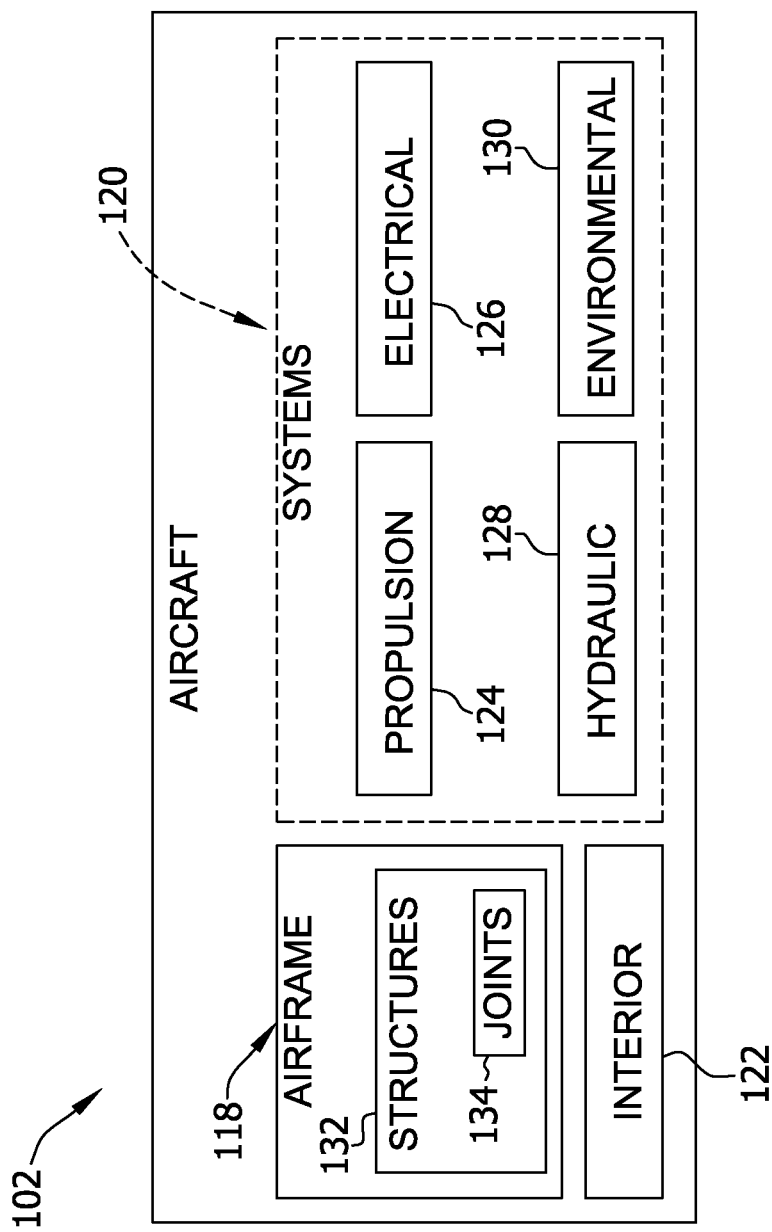
FIG. 2 is a block diagram of an exemplary aircraft.

As shown in FIG. 2, an aircraft 102 produced via method 100 may include an airframe 118 including a plurality of systems 120 and an interior 122. Exemplary high-level systems 120 include one or more of a propulsion system 124, an electrical system 126, a hydraulic system 128, and/or an environmental system 130. Any number of other systems may be included. In such examples, airframe 118 may be formed from structures 132 that may be coupled together with joints 134. Moreover, structures 132 may include, for example, without limitation, skin panels, wing boxes, stabilizers, longerons, keel beam, spars, ribs, and/or other suitable types of structures for airframe 118. Although an aerospace example is illustrated via aircraft 102, in alternative implementations, the technology may be used with non-aviation industries, such as the automotive and/or marine industries.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to only including, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
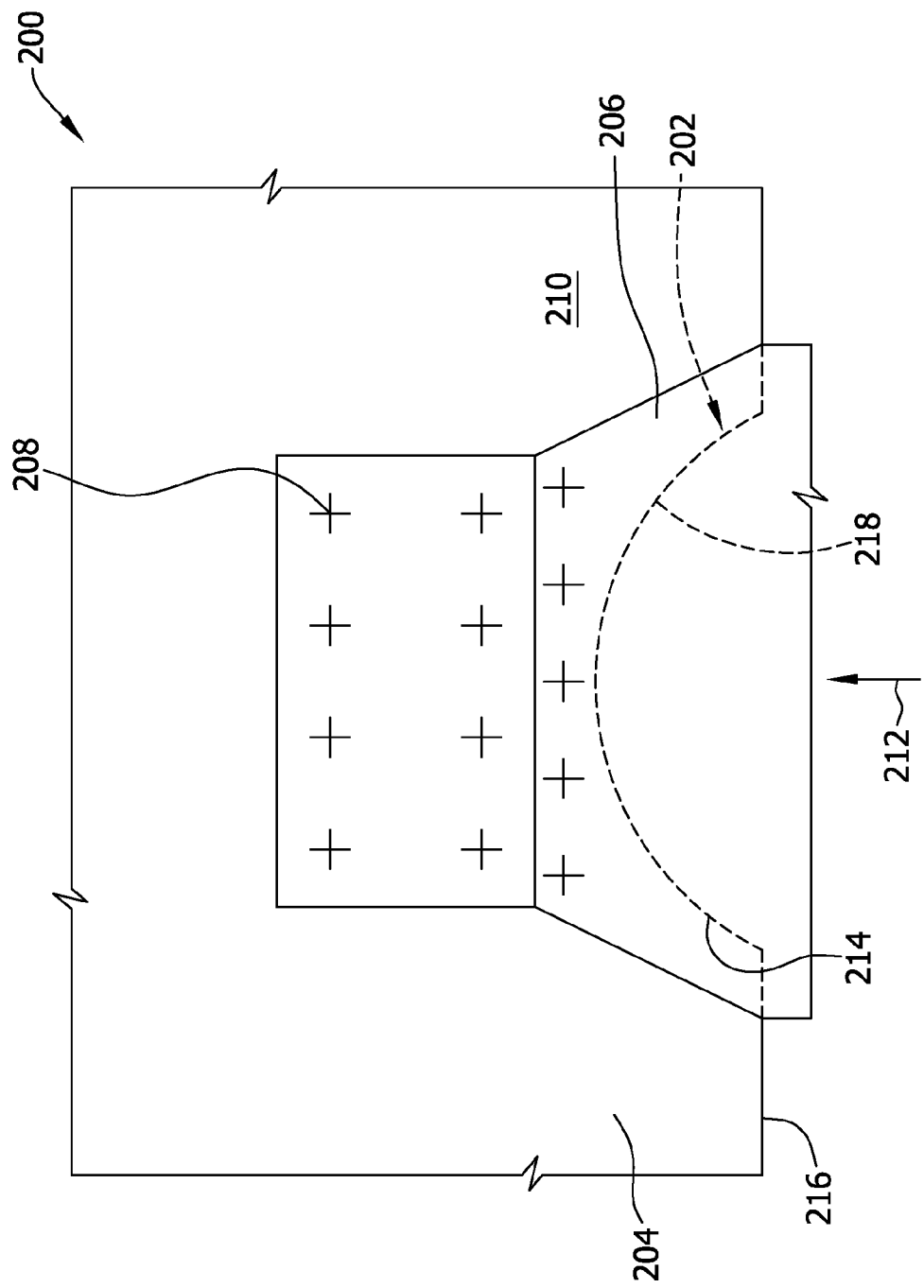
FIG. 3 is a schematic diagram of an exemplary joint environment of an aircraft.

FIG. 3 is a schematic diagram of an exemplary joint environment 200 that may be used to implement a joint for an aircraft, such as, for example, joints 134 (shown in FIG. 2) of aircraft 102 (shown in FIGS. 1 and 2). In the exemplary implementation, a direct bearing joint 202 may be formed between a first aircraft structure 204 and a second aircraft structure 206. Joint 202 is formed where at least first structure 204 and second structure 206 are coupled together using a plurality of fasteners 208. In the exemplary implementation, first aircraft structure 204 is a skin panel 210 used in a wing (not shown) or the fuselage (not shown in FIG. 3) of airframe 118 (shown in FIG. 2) and second aircraft structure 206 is a major load bearing component of airframe 118, such as, but not limited to, at least one of a wheel well longeron (not shown in FIG. 3), a keel beam (not shown in FIG. 3), and a wing rear spar frame (not shown). In the exemplary implementation, second aircraft structure 206 is fabricated from a metallic material, such as, but not limited to titanium, aluminum, steel, or any combination thereof. Alternatively, second aircraft structure 206 may be fabricated from any suitable metal or metal alloy that facilitates operation of joint 202 as described herein.

Skin panel 210 includes a plurality of composite material layers that are laminated together to form a composite skin. As used herein, a "laminated" object refers to an object fabricated with laminates, and typically includes multiple layers or plies of composite that include fibers in a resin, or metallic layers. The layers of composite material may be formed in any manner desired for constructing skin panel 210. For example, different layers may be associated with different angles or orientations with respect to other layers, depending on the particular implementation. Further, resin and other materials used in the composite material also may vary, depending on the particular implantation.

Furthermore, as used herein, "composite" means engineered materials fabricated from two or more constituent materials. In one exemplary implementation, the composite material is a carbon fiber reinforced polymer (CFRP) composite, that includes carbon fiber embedded in a matrix or resin, especially epoxy matrices, thermosetting or thermoplastic resins. CFRP composites have an advantageous strength/weight ratio given that it is a material that is generally lightweight, but possess strong structural properties. Alternatively, other materials and other composite materials may be used, including those containing, but not limited to, fiberglass, ceramics, and/or other elements.

In locations where joints are formed between composite materials and metallic structures, some joints may be required to carry higher loads than other joints. Generally, direct bearing joint 202 may be formed by coupling first aircraft structure 204 to second aircraft structure 206. More specifically, direct bearing joint 202 is formed by coupling composite fuselage skin 210 to at least one of the wing rear spar frame (not shown), the keel beam (not shown in FIG. 3), and/or the wheel well longeron (not shown in FIG. 3). In the exemplary implementation, direct bearing joint 202 is positioned along airframe 118 such that joint 202 receives a significant concentrated compressive load, as shown by arrow 212. Load 212 is direct into second aircraft structure 206 and then is subsequently transferred into skin panel 210 through direct bearing joint 202 for distribution throughout the fuselage. Direct bearing joint 202 includes a first feature 214 that is cutout of an edge 216 of skin 210 and a second feature 218 extending from second structure 206. First feature 214 includes a shape that is complementary to the shape of second feature 218 such that features 214 and 218 are in intimate contact along direct bearing joint 202. In such a configuration, the direct contact between skin 210 and second structure 206 provides for distribution of concentrated compression load 212 through skin 210 to reduce stress concentrations and enable reaction of non-vertical load components.

Furthermore, direct bearing joint 202 serves as a primary load path for load 212 distribution into skin 210. The plurality of fasteners 208 serves a secondary, or fail-safe, load path. The use of direct bearing joint 202 enables load 212 to be distributed into skin 210 using fewer and smaller fasteners 208 than would be required if fasteners 208 served as the primary load path. Fewer fasteners 208 facilitates reducing the overall weight of the aircraft and also reducing costs through less raw materials and simpler assembly. In the exemplary implementation, direct bearing joint 202 is substantially arch-shaped to facilitate evenly distributing load 212 throughout skin 210. Alternatively, direct bearing joint 202 may have any shape, such as, but not limited to, a step shape or an angular shape, that facilitates operation of joint 202 as described herein.

In certain implementations, direct bearing joint 202 may be used in other platforms other than aircraft 102. For example, direct bearing joint 202 may be used in a platforms including, but not limited to, a mobile platform, a stationary platform, a land-based structure, an aquatic-based structure, a space-based structure, and/or some other suitable object. More specifically, direct bearing joint 202 may be used within, for example, without limitation, a submarine, a bus, a personnel carrier, a tank, a train, an automobile, a spacecraft, a space station, a satellite, a surface ship, a power plant, a dam, a bridge, a manufacturing facility, and/or a building.

FIGS. 4-8 illustrate an exemplary direct bearing joint 202 formed between first structure 204, such as composite skin 210 (shown in FIG. 3) and second structure 206, such as the wheel well longeron, with the understanding that such a joint 202 is not limited to being formed between these two components, but may also be formed between skin 210 and a keel beam and/or between skin 210 and a wing rear spar.

Figure 4:
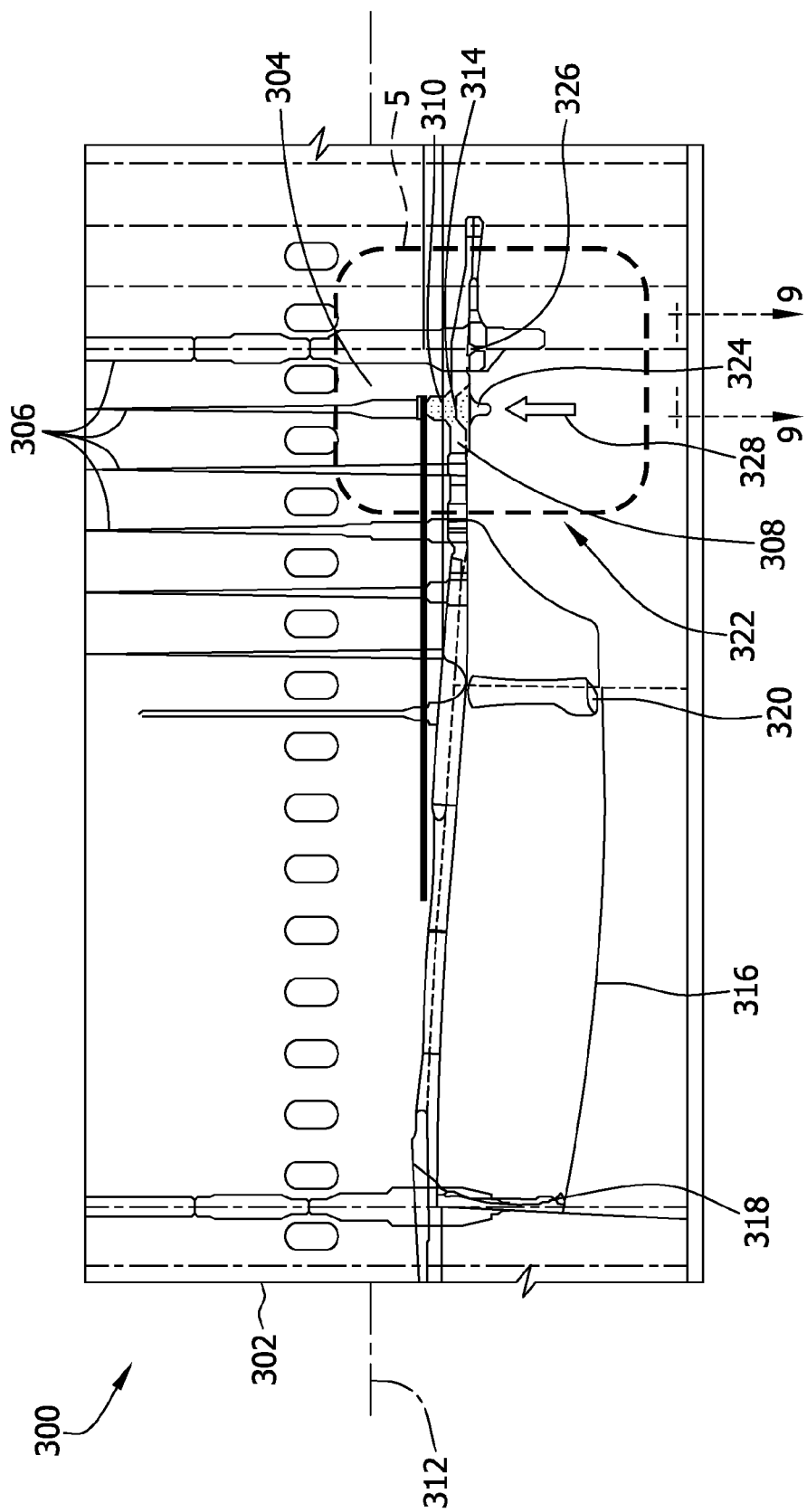
FIG. 4 is a side view of an exemplary aircraft fuselage illustrating a main landing gear bay.

Referring now to FIG. 4, a side view of an exemplary aircraft 300 is presented. Aircraft 300 is substantially similar to aircraft 102 (shown in FIGS. 1 and 2) and may be manufactured and serviced using method 100 (shown in FIG. 1). In the exemplary implementation, aircraft 300 includes a fuselage 302 that includes a composite skin 304, which is substantially similar to skin 210, a plurality of frames 306, and at least one stringer or longeron, such as a wheel well longeron 308, wherein skin 304, frames 306, and wheel well longeron 308 are coupled together by at least a plurality of fasteners 310. Frames 306 are spaced longitudinally through fuselage 302 along a longitudinal axis 312, and are configured to support skin 304 to provide support to fuselage stringers, and/or to introduce discrete loads into skin 304.

In the exemplary implementation, a direct bearing joint 314 is formed between composite first aircraft structure 204 and metallic second aircraft structure 206 that are coupled together using a plurality of fasteners, such as fasteners 208. More specifically, in the implementation, first aircraft structure 204 is skin 304, second aircraft structure 206 is wheel well longeron 308, and fasteners 208 are fasteners 310. Fuselage 302 also includes a wing profile section 316 that includes a front spar fitting 318 and a rear spar fitting 320. A main landing gear wheel well 322 is positioned aft of rear spar fitting 320 for use in stowing the main landing gear (not shown) when retracted and is adjacent to direct bearing joint 314. In the exemplary implementation, fuselage 302 also includes a forward main landing gear joint 324 that is positioned adjacent to direct bearing joint 314 and an aft main landing gear joint 326 that is positioned aft of forward main landing gear joint 324. Joints 324 and 326 couple the main landing gear to fuselage 302. Alternatively, the main landing gear of aircraft 300 may be coupled to fuselage 302 by any number of joints in any position along fuselage 302 that facilitates operation of aircraft 300 as described herein. Accordingly, direct bearing joint 314 may be formed between fuselage skin 304 and any one or more main landing gear joints, and is not limited to being formed at joint 324 as described herein.

In the exemplary implementation, upon landing, the landing gear imparts a large compression punch load, as shown by arrow 328, into fuselage 302. In the exemplary implementation, compressive load 328 is approximately one million pounds of force, or higher. Alternatively, load 328 may be any amount of force that requires use of direct bearing joint 314 as described herein. Compressive load 328 is transferred to wheel well longeron 308 from a single location at forward main landing gear joint 324. Load 328 is then transferred from longeron 308 to skin 304 through direct bearing joint 314 for distribution throughout fuselage 302. As described above, to transfer large loads, conventional methods of load transfer requires the use an excessive amount of large fasteners spread over a large area. However, the use of such fasteners would increase the weight, cost and complexity of the aircraft. In contrast, direct bearing joint 314 reduces the size and number of fasteners 310 required to couple skin 304 to longeron 308 for the distribution of large compression load 328 as is described in further detail below.

Figure 5:
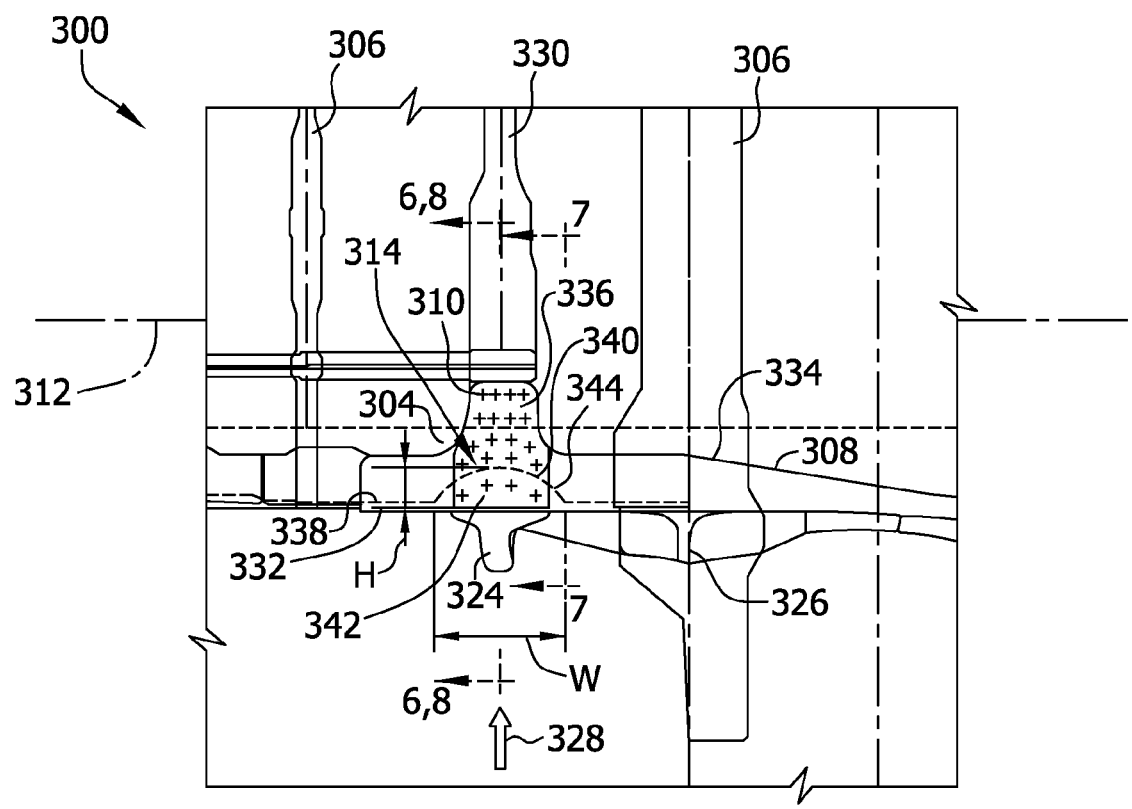
FIG. 5 is an enlarged view of a portion of the aircraft fuselage shown in FIG. 4 and illustrating an exemplary direct bearing joint.

FIG. 5 is an enlarged view of a portion of aircraft fuselage 302 outlined in box 5 shown in FIG. 4 illustrating direct bearing joint 314. In the exemplary implementation, joint 314 is positioned proximate forward main landing gear joint 324 and at least partially overlaps a bulkhead 330 of plurality of frames 306 such that load 328 is transferred through wheel well longeron 308 and principal bulkhead 330 to be distributed through skin 304. Alternatively or in combination, joint 314 may be positioned at any location on aircraft 300 where a large compressive load transfer takes place between skin 304 and another aircraft structural component, such as the keel beam and/or the rear wing spar. Forming direct bearing joint 314 includes positioning longeron 308 in intimate contact with skin 304 and coupling longeron 308 and skin 304 together with fasteners 310. Longeron 308 includes a horizontal portion 332 that is substantially perpendicular to load 328 and a vertical portion 334 that is substantially parallel to load 328. Vertical portion 334 includes an extension flange 336 that extends from vertical portion 334 in a direction substantially parallel to load 328. Extension flange 336 overlaps at least a portion of bulkhead 330 such that skin 304 is coupled between flange 336 and bulkhead 330 to facilitate strengthening joint 314. Skin 304 includes a distal skin edge 338 that contacts a portion of longeron 308 at direct bearing joint 314, but that is also positioned a distance away from longeron horizontal portion 332 such that a gap is formed between horizontal portion 332 and skin edge 338 on either side of direct bearing joint 314 along fuselage 302.

In the exemplary implementation, direct bearing joint 314 includes a first arcuate feature, or an arcuate cutout 340 from skin edge 338 that is configured to receive a correspondingly shaped second arcuate feature, or platform 342, on vertical portion 334 of longeron 308. In such a configuration, skin 304 and longeron 308 are in intimate contact along arch-shaped direct bearing joint 314 such that concentrated compression load 328 is distributed through skin 304 reducing stress concentration, and enabling reaction of non-vertical load components. In the exemplary implementation, cutout 340 includes an arcuate cutout edge 344 having a longitudinal width W along axis 312 and a varying height H that extends along vertical portion 334 between skin edge 338 and cutout edge 344. The dimensions of height H and width W are optimized based on both the size of both aircraft 300 and load 328 such that direct bearing joint 314 best distributes load 328 through skin 304. In the exemplary implementation, cutout 340 is at least one of, but not limited to, elliptical and/or semi-circular, and/or rational B-spline. Alternatively, cutout 340 may be any shape, such as linear, that facilitates operation of direct bearing joint 314 as described herein.

Platform 342 of longeron 308 extends between inward vertical portion 334 and bulkhead 330 and includes a height H and a width W that are substantially similar to that of cutout 340 such that platform 342 provides an arcuate step that is configured to correspond to adjacent arcuate cutout 340. Platform height H and width W define a shape that is complementary to the arcuate shape of cutout 340 to facilitate load transfer therebetween. More specifically, platform 342 includes a concave platform edge 346 that is directly abutted against convex cutout edge 344 of cutout 340. The arcuate shape of direct bearing joint 314 facilitates distributing load 328 over a larger area of cutout edge 344 along width W than would be possible with a simply linear interface. The arcuate shape of the direct bearing joint 314 also facilitates transfer of loads with components that are not completely vertical.

Figure 6:
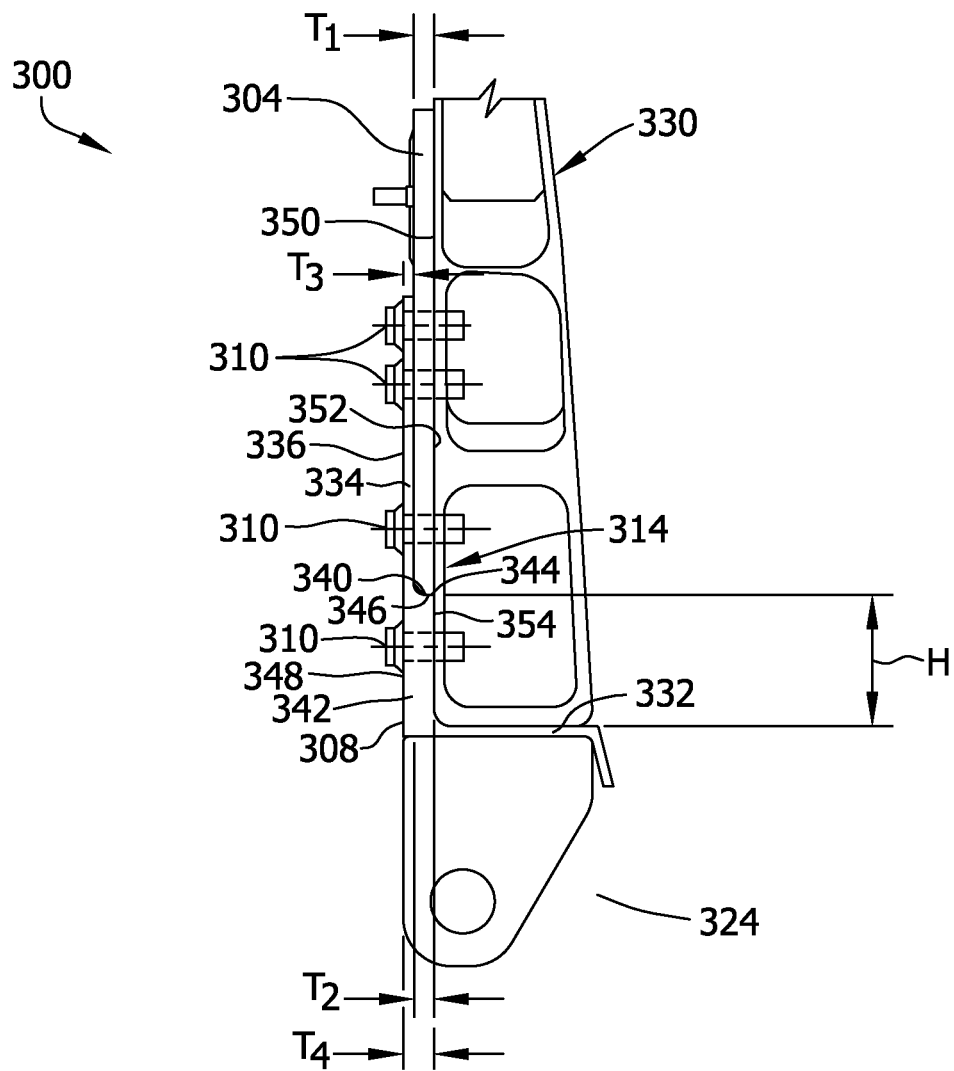
FIG. 6 is a cross-sectional view of the direct bearing joint shown in FIG. 4 and taken at location 6-6.
Figure 7:
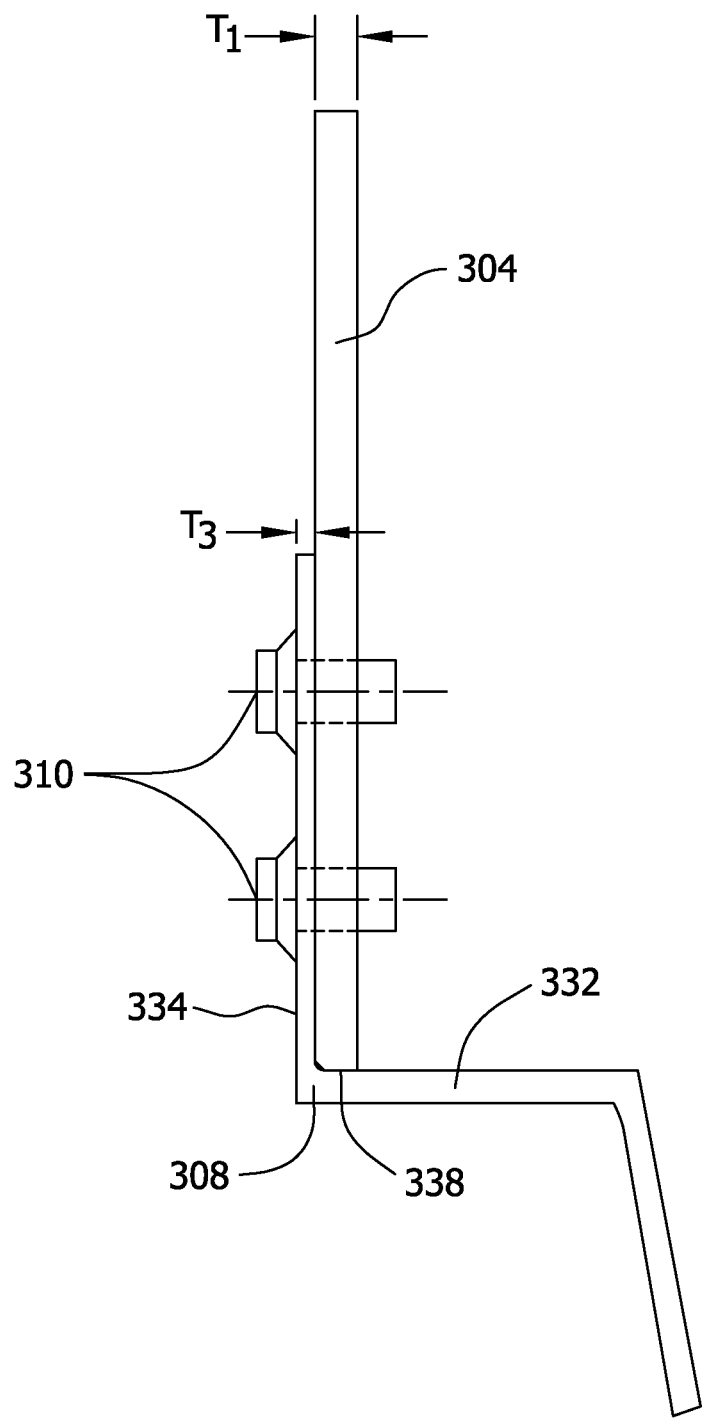
FIG. 7 is a cross-sectional view of the direct bearing joint shown in FIG. 4 and taken at location 7-7.

FIG. 6 is a cross-sectional view of direct bearing joint 314 at a location 6-6 (shown in FIG. 4) along aircraft fuselage 302. Similarly, FIG. 7 is a cross-sectional view of the interface between skin 304 and longeron 308 at a location that is at a distal end of direct bearing joint 314, such as location 7-7 (shown in FIG. 4) along fuselage 302 that is aft of location 6-6. FIG. 6 illustrates a cross-sectional view of direct bearing joint 314 at location 6-6 along a centerline of principal bulkhead 330 where height H is at a maximum. In the exemplary implementation, skin 304 includes a thickness $T_1$ that is substantially similar to a thickness $T_2$ of platform 342. Furthermore, extension flange 336 includes a thickness $T_3$ such that a base 348 of vertical portion 334 proximate horizontal portion 332 has a thickness $T_4$ equal to extension flange thickness $T_3$ added to platform thickness $T_2$. Skin 304 also includes an inner surface 350 that is coupled in a face-to-face relationship with an outer surface 352 of principal bulkhead 330. Moreover, platform 342 includes an inner surface 354 that coupled in a face-to-face relationship with outer surface 352 such that inner surfaces 350 and 354 are substantially flush.

FIGS. 6 and 7 illustrate a continuous interface between skin 304 and longeron 308 along direct bearing joint 314. Cutout edge 344 is in continuous contact with platform edge 346 along direct bearing joint 314, as shown in FIG. 6 at location 6-6, such that there is no gap between skin 304 and longeron 308. Such a continuous interface facilitates distributing punch compression load 328 through direct bearing joint 314 into skin 304. Furthermore, should compression load 328 contain a non-vertical component, the arcuate shape of direct bearing joint 314 facilitates distributing such stress concentrations more evenly through skin 304. FIG. 7 is taken at an aft termination point of direct bearing joint 314, and more specifically, of platform 342. FIG. 7 illustrates that contact between skin edge 338 and longeron 308 ends at the distal ends of direct bearing joint 314. More specifically, skin edge 338 is positioned a distance away from longeron horizontal portion 332 such that a gap (best shown in FIG. 5) is defined therebetween.

In the exemplary implementation, longeron 308, skin 304, and principal bulkhead 330 are coupled together with plurality of fasteners 310. At location 6-6, fasteners 310 extend through extension flange 336, skin 304, and principal bulkhead 330 and also through base 348, including platform 342, and bulkhead 330. At location 7-7, fasteners 310 extend simply through vertical portion 334 and skin 304. Fasteners 310 may be necessary to secure longeron 308 and skin 304 together, although some fasteners 310 may not penetrate skin 304. However, because at least a portion of load 328 is directly transferred into skin 304 through direct bearing joint 314, fasteners 310 carry only a portion of load 328. Accordingly, the number and size of fasteners 310 required at joint 314 to carry load 328 is significantly reduced as compared to aircraft having a gap or a linear relationship between the skin and longeron. More specifically, the continuous interface between cutout 340 and platform 342 and the plurality of fasteners 310 that couple skin 304 to longeron 308 form two distinct load paths through which load 328 is distributed. Furthermore, because direct bearing joint 314 does not carry tension loads, fasteners 310 are configured to carry any tension loads that may be imparted onto direct bearing joint 314. The tension loads at direct bearing joint 314 are generally much smaller than compression load 328, thus enabling them to be carried by the smaller and fewer fasteners 310.

Figure 8:
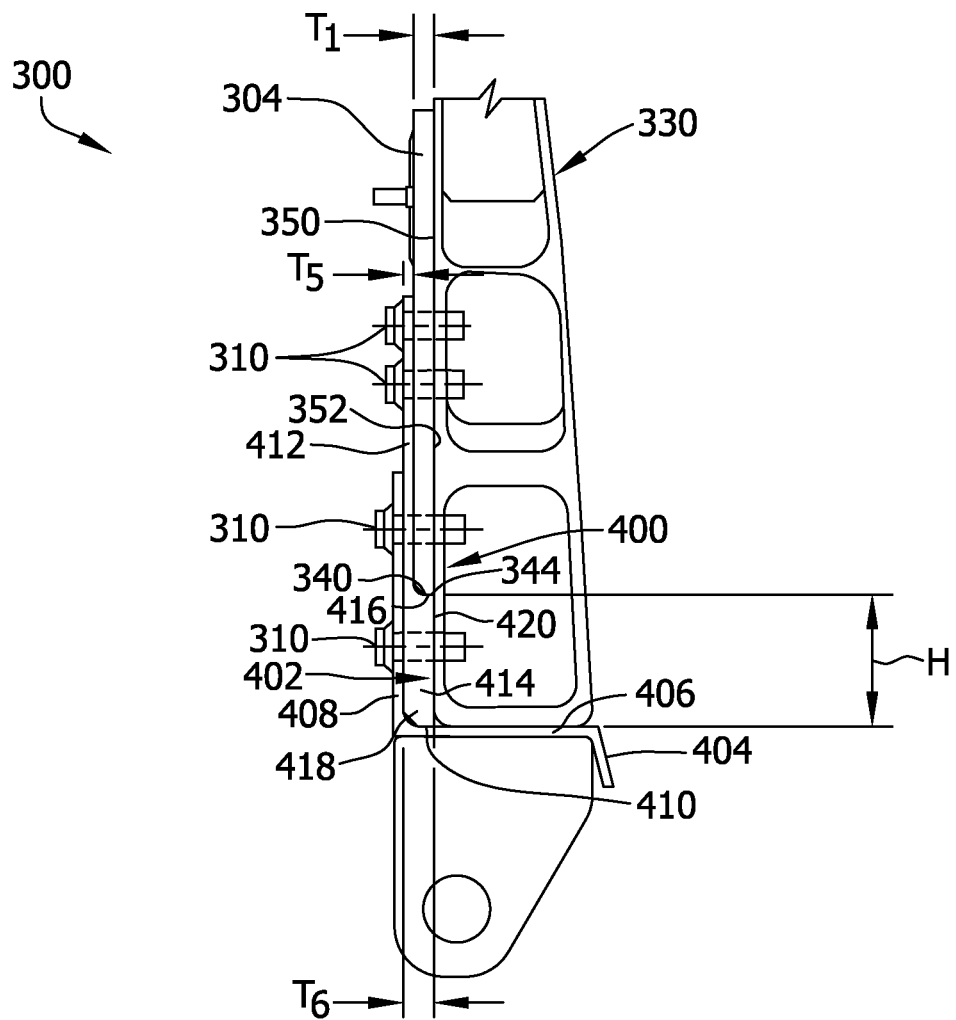
FIG. 8 is a cross-sectional view of an alternative direct bearing joint that may be used with the aircraft fuselage shown in FIG. 4 and taken at location 8-8.

FIG. 8 is a cross-sectional view of an alternative direct bearing joint 400 at location 8-8 along aircraft fuselage 302 (shown in FIG. 4). Location 8-8 is the same location as the cross-section taken at location 6-6 and shown in FIG. 6. Direct bearing joint 400 is substantially similar to direct bearing joint 314 (shown in FIGS. 4-6) in operation and composition such that skin 304 is coupled to second aircraft structure 206 (shown in FIG. 3), with the exception that direct bearing joint 400 includes skin 304 coupled to a bearing plate 402 that is coupled to a load bearing structural component of aircraft 300. As such, like components shown in FIG. 8 are labeled with like reference numbers used in FIGS. 4-6. Direct bearing joint 400 may be used in cases where it may be easier to fabricate bearing plate 402 for coupling to a traditional (non-modified) longeron, keel beam, or wing rear spar frame instead of modifying one or more of the metal aircraft structures to include platform 342 and extension flange 336. In such an implementation, plate 402 is fabricated from a metallic material, such as, but not limited to titanium, aluminum, steel, or any combination thereof. Alternatively, plate 402 may be fabricated from any suitable metal or metal alloy that facilitates operation of joint 202 as described herein.

As shown in FIG. 8, the structural component is a wheel well longeron 404. However, the structural component may be any structural component, such as, but not limited to, a keel beam and/or a wing rear spar frame. In the implementation shown in FIG. 8, direct bearing joint 400 includes skin 304, bulkhead 330, wheel well longeron 404 having a horizontal portion 406 and a vertical portion 408, and bearing plate 402. Bearing plate 402 is coupled to vertical portion 408 and includes a distal plate edge 410 that is coupled in contact with horizontal portion 406. Bearing plate 402 also includes an extension flange 412 and an arcuate platform 414 that are substantially similar to extension flange 336 and platform 342, respectively. Similarly to direct bearing joint 314, cutout 340 is configured to receive correspondingly-shaped platform 414 such that skin 304 and plate 402 are in intimate contact along arch-shaped direct bearing joint 400 to facilitate distribution of concentrated compression load 328 through skin 304 without using as many large fasteners as would be required given a linear interface between skin edge 338 and plate edge 410. Alternatively, direct bearing joint 400 may have any shape, such as, but not limited to, a linear shape, that facilitates operation of joint 400 as described herein.

Platform 414 of bearing plate 402 extends between vertical portion 408 and principal bulkhead 330 and includes a height H and a width W (not shown) that are substantially similar to that of cutout 340 such that platform 414 provides an arcuate step that is configured to correspond to adjacent arcuate cutout 340. More specifically, platform 414 includes a concave platform edge 416 that is directly abutted against convex cutout edge 344 of cutout 340. The arcuate shape of direct bearing joint 400 facilitates distributing load 328 over a larger area of cutout edge 344 along width W than would be possible with a simply linear interface.

In the implementation shown in FIG. 8, skin 304 and platform 414 include thickness $T_1$ and extension flange 412 includes a thickness $T_5$ that is substantially equal to thickness $T_3$ (shown in FIG. 6) such that a base 418 of plate 402 proximate horizontal portion 406 has a thickness $T_6$ that is substantially similar to thickness $T_4$ (shown in FIG. 6). Skin inner surface 350 is coupled in a face-to-face relationship with outer surface 352 of bulkhead 330. Moreover, platform 414 includes an inner surface 420 that is coupled in a face-to-face relationship with outer surface 352 such that inner surfaces 350 and 420 are substantially flush with each other.

Direct bearing joint 400 includes a continuous interface between skin 304 and plate 402. More specifically, cutout edge 344 is in continuous contact with platform edge 416 along direct bearing joint 400 such that there is no gap between skin 304 and plate 402 along joint 400. Such a continuous interface facilitates distributing punch compression load 328 through direct bearing joint 400 into skin 304. Furthermore, should compression load 328 contain a non-vertical component, the arcuate shape of direct bearing joint 400 facilitates distributing such stress concentrations more evenly through skin 304.

In this implementation, longeron 308, skin 304, bulkhead 330, and bearing plate 402 are coupled together with plurality of fasteners 310. At location 8-8, fasteners 310 extend through extension flange 412, skin 304, and bulkhead 330 and also through vertical portion 408, base 418, including platform 414, and bulkhead 330. Fasteners 310 may be necessary to secure longeron 308 and skin 304 together, although some fasteners 310 may not penetrate skin 304. However, because at least a portion of load 328 is directly transferred into skin 304 through direct bearing joint 400, fasteners 310 carry only a portion of load 328. Accordingly, the number and size of fasteners 310 required at joint 400 to carry load 328 is significantly reduced as compared to aircraft having a gap or a linear relationship between the skin and longeron. More specifically, the continuous interface between cutout 340 and platform 414 and the plurality of fasteners 310 that couple skin 304 to plate 402 form two distinct load paths through which load 328 is distributed compared to aircraft with only a single load path through the fasteners.

Figure 9:
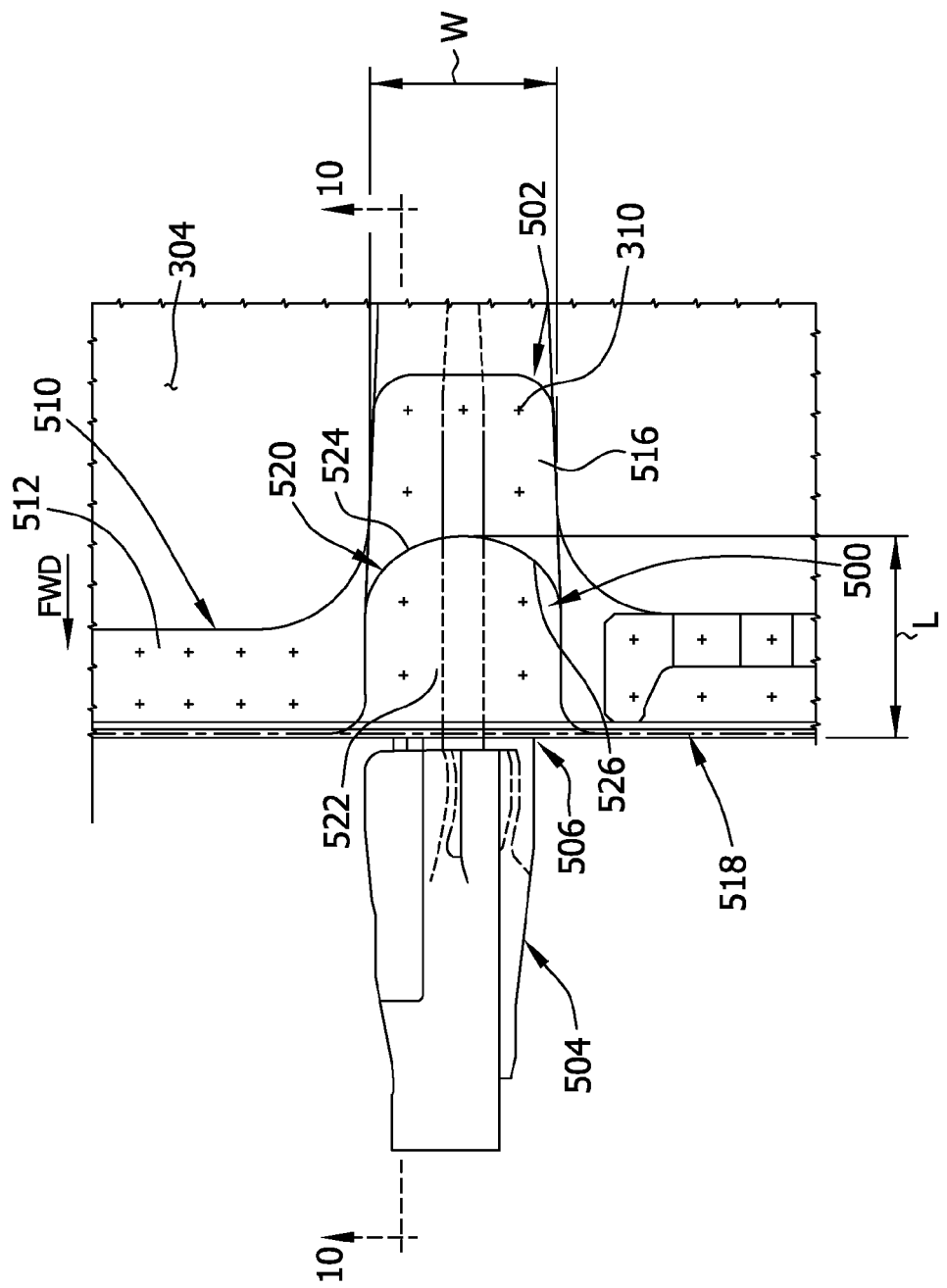
FIG. 9 is an alternative direct bearing joint that may be used with the aircraft fuselage shown in FIG. 4 and taken at location 9-9.
Figure 10:
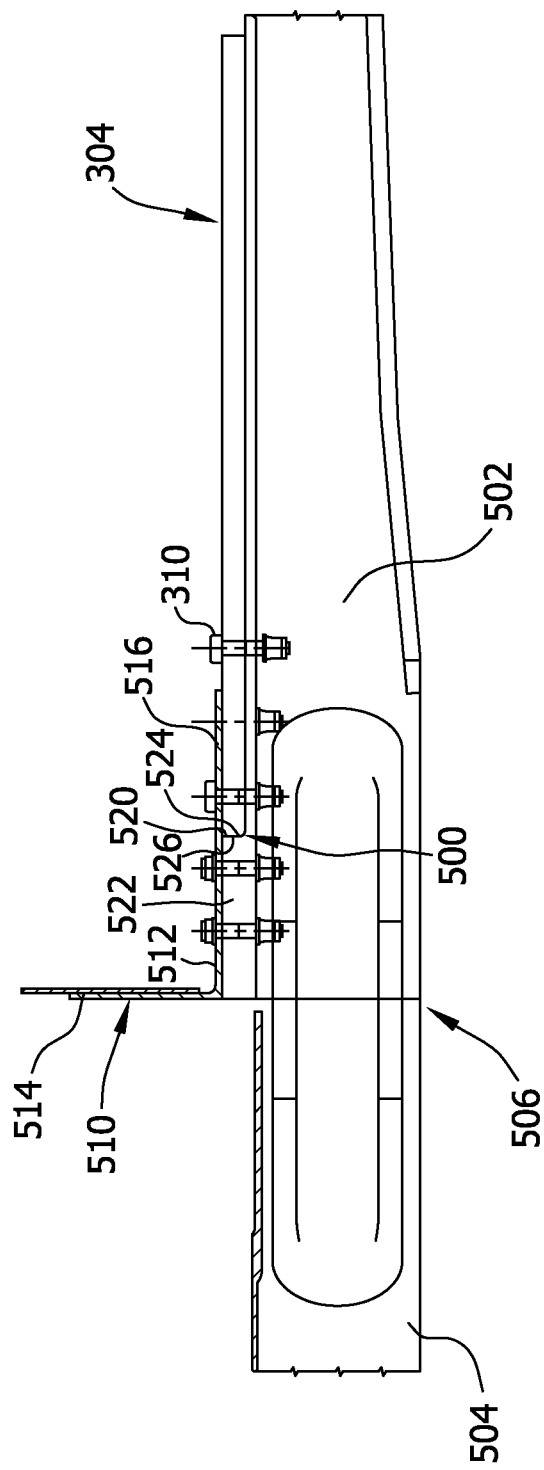
FIG. 10 is a cross-sectional view of the alternative direct bearing joint shown in FIG. 9 and taken at location 10-10.

FIG. 9 is another alternative direct bearing joint 500 that may be used with aircraft fuselage 302 (shown in FIG. 4) and taken at location 9-9 (shown in FIG. 4). FIG. 10 is a cross-sectional view of joint 500 taken at location 10-10. Direct bearing joint 500 is substantially similar to direct bearing joints 314 and 400 (shown in FIGS. 4-6 and 8) in operation and composition such that skin 304 is coupled to second aircraft structure 206 (shown in FIG. 3), with the exception that direct bearing joint 500 includes skin 304 coupled to a keel chord extension 502 rather than longeron 308. In this alternative implementation, aircraft 300 (shown in FIG. 4) includes a keel chord extension 502, a keel chord 504, and a keel joint 506 therebetween. Keel chord extension 502 and keel chord 504 serve as a keel beam for aircraft 300 that is configured to transfer a compressive load 508 into skin 304. Aircraft 300 also includes an aft wheel well chord 510 that is coupled to at least a portion of both keel chord extension 502 and skin 304. Aft wheel well chord 510 includes a horizontal portion 512 that is substantially parallel to load 508 and a vertical portion 514 that is substantially perpendicular to load 508. Horizontal portion 512 includes an extension flange 516 that extends from horizontal portion 512 in a direction substantially parallel to load 508. Extension flange 516 overlaps at least a portion of keel chord extension 502 such that skin 304 is coupled between flange 516 and keel chord extension 502 to facilitate strengthening direct bearing joint 500. Skin 304 includes a distal skin edge 518 that terminates proximate vertical portion 514 of aft wheel well chord 510 at keel joint 506.

In this implementation, direct bearing joint 500 includes a cutout 520 from skin edge 518 that is configured to receive a correspondingly shaped platform 522 that extends from keel chord extension 502. Cutout 520 and platform 522 are substantially similar in composition and function to cutout 340 and platform 342, respectively. In such a configuration, skin 304 and keel chord extension 502 are in intimate contact along arch-shaped direct bearing joint 500 such that concentrated compression load 508 is distributed through skin 304, reducing stress concentration and enabling reaction of non-vertical load components. In this implementation, cutout 520 includes an arcuate cutout edge 524 having a width W and a varying length L that extends along horizontal portion 512 of aft wheel well chord 510 between skin edge 518 and cutout edge 524. The dimensions of length L and width W are optimized based on both the size of both aircraft 300 and load 508 such that direct bearing joint 500 best distributes load 508 through skin 304.

Platform 522 of keel chord extension 502 extends along horizontal portion 512 of aft wheel well chord 510 and includes a length L and a width W that are substantially similar to that of cutout 520 such that platform 522 provides an arcuate step that is configured to correspond to adjacent arcuate cutout 520. Platform 522 length L and width W define a shape that is complementary to the arcuate shape of cutout 520 to facilitate load transfer therebetween. More specifically, platform 522 includes a concave platform edge 526 that is directly abutted against convex cutout edge 524 of cutout 520. The arcuate shape of direct bearing joint 500 facilitates distributing load 508 over a larger area of cutout platform edge 526 along width W than would be possible with a simply linear interface. The arcuate shape of direct bearing joint 500 also facilitates transfer of loads with components that are oriented obliquely with respect to load 508.

Direct bearing joint 500 includes a continuous interface between skin 304 and keel chord extension 502. More specifically, cutout edge 524 is in continuous contact with platform edge 526 along direct bearing joint 500 such that there is no gap between skin 304 and keel chord extension 502 along joint 500. Such a continuous interface facilitates distributing compression load 508 through direct bearing joint 500 into skin 304. Furthermore, the arcuate shape of direct bearing joint 500 facilitates distributing loads that contain a load component oriented obliquely with respect to load 508 more evenly through skin 304.

In this implementation, fasteners 310 may be necessary to couple aft wheel well chord 510, skin 304, and keel chord extension 502 together. However, some fasteners 310 may not penetrate skin 304 and extend only though aft wheel well chord 510 and keel chord extension 502, more specifically, platform 522 of keel chord extension 502. Fasteners 310 are configured to carry only a portion of load 508 because a portion of load 508 is directly transferred into skin 304 from keel chord extension 502. Accordingly, the number and size of fasteners 310 required at joint 500 to carry load 508 is significantly reduced as compared to aircraft having a gap or a linear relationship between the skin and keel chord extension. More specifically, the continuous interface between cutout 520 and platform 522 and the plurality of fasteners 310 that couple skin 304 to keel chord extension 502 form two distinct load paths through which load 508 is distributed compared to aircraft with only a single load path through the fasteners.

The implementations described herein facilitate direct loading of a composite skin that is coupled to a metal component. More specifically, direct loading of the composite skin is accomplished by forming a direct bearing joint having an arcuate continuous interface between the skin and a load bearing structure. For example, the skin includes an arcuate cutout that directly contacts a correspondingly-shaped platform on a load bearing structure at a point where a large compressive load is applied to the structure. Joints between composite and metal structures are generally held together with fasteners. The methods described herein facilitate distributing large compressive loads by directly transferring at least a portion of the load into the skin such that a first load path is formed at the joint between the skin and the structure and a second load path is formed through the fasteners. Multiple loads paths reduce the number and size of the fasteners required to safely transfer the large loads into the composite skin, thus reducing the weight, cost, and assembly time of the structure having the direct bearing joint.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a direct bearing joint, said method comprising:
    providing a load bearing structure including a first portion and a second portion, coupled to and extending from the first portion such that the first portion is substantially perpendicular to the second portion, the first portion including a first structural feature having an arcuate shape, wherein the load bearing structure includes one of a longeron, a keel beam, and a wing spar of an aircraft;
    providing a composite skin including a second structural feature having an arcuate shape;
    coupling the composite skin between a structural flange on the first portion of the load bearing structure and a bulkhead; and
    coupling the first structural feature to the second structural feature such that the first and second structural features are mated against each other to facilitate distributing compressive loads induced into the load bearing structure into the composite skin.

2. The method in accordance with claim 1, wherein providing a load bearing structure including a first structural feature further comprises providing a load bearing structure including a convex platform edge, and wherein providing a composite skin including a first structural feature further comprises providing a composite skin including a concave cutout edge.

3. The method in accordance with claim 2, wherein coupling the first structural feature to the second structural feature further comprises mating the convex platform edge in continuous direct contact against the concave cutout edge.

4. The method in accordance with claim 1, further comprising coupling the load bearing structure to the composite skin using a plurality of fasteners such that a first load path is defined through the first and second structural features and a second load path is defined through the plurality of fasteners.

5. The method in accordance with claim 1, wherein providing a load bearing structure further comprises providing a bearing plate.

6. The method in accordance with claim 1 further comprising:
    coupling a first inner surface of the load bearing structure in a face-to-face relationship with an outer surface of the bulkhead; and
    coupling a second inner surface of the composite skin in a face-to-face relationship with the outer surface such that the first and second inner surfaces are flush.

7. A direct bearing joint comprising:
    a load bearing structure comprising a first portion and a second portion, said first portion comprising a structural flange and said second portion coupled to and extending from said first portion such that said first portion is substantially perpendicular to said second portion, said first portion comprising a first structural feature that has an arcuate shape, wherein the load bearing structure comprises one of a longeron, a keel beam, and a wing spar of an aircraft; and
    a composite skin coupled to said load bearing structure, said composite skin comprising a second structural feature that has an arcuate shape, said second structural feature configured to mate against said first structural feature to facilitate distributing compressive loads induced into said load bearing structure into said composite skin, wherein said composite skin is coupled between said structural flange and a bulkhead.

8. The joint in accordance with claim 7, wherein said first structural feature is a convex platform and said second structural feature is a complementary concave cutout.

9. The joint in accordance with claim 7, wherein said first structural feature comprises a first edge, and said second structural feature comprises a second edge that is shaped to mate against said first edge.

10. The joint in accordance with claim 7, further comprising a plurality of fasteners configured to couple said composite skin to said load bearing structure, such that a first load path is defined through said first and second structural features, and a second load path is defined through said plurality of fasteners.

11. The joint in accordance with claim 7, wherein said load bearing structure is a bearing plate coupled to one of the wheel well longeron, keel beam, and wing spar.

12. The joint in accordance with claim 9, wherein said load bearing structure comprises a first inner surface coupled in a mating relationship with an outer surface of said bulkhead, said composite skin comprises a second inner surface coupled in a mating relationship with said outer surface of said bulkhead such that said first and second inner surfaces are substantially flush against each other.

13. An aircraft comprising a direct bearing joint, said aircraft comprising:
    a bulkhead;
    a load bearing structure coupled to said bulkhead and comprising a first portion and a second portion, said first portion comprising a structural flange and said second portion coupled to and extending from said first portion such that said first portion is substantially perpendicular to said second portion, said first portion comprising a first structural feature that has an arcuate shape, wherein the load bearing structure comprises one of a longeron, a keel beam, and a wing spar of an aircraft;

a composite skin coupled between said structural flange and said bulkhead, said composite skin comprising a second structural feature that has an arcuate shape, and said second structural feature configured to mate against said first structural feature to facilitate distributing compressive loads induced into said load bearing structure into said composite skin.

14. The aircraft in accordance with claim 13, wherein said first structural feature comprises a first edge, said second structural feature comprises a second edge that is shaped to mate against said first edge.

15. The aircraft in accordance with claim 13 further comprising a plurality of fasteners configured to couple said composite skin to said load bearing structure, such that a first load path is defined through said first and second structural features, and a second load path is defined through said plurality of fasteners.

* * * * *